July 26, 1932.  F. M. GABLER  1,869,244
TIRE TOOL
Filed Sept. 1, 1931
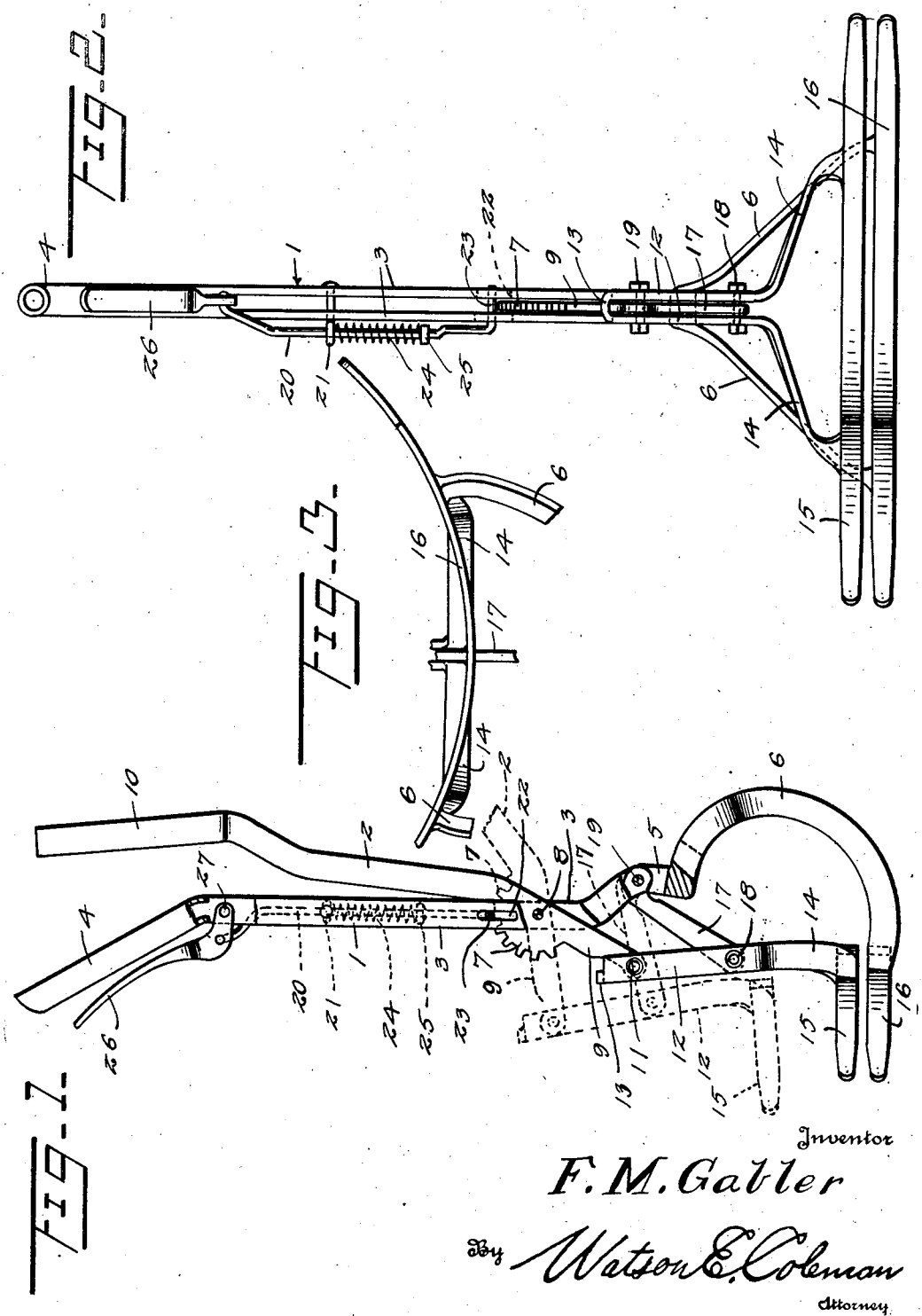
Inventor
F. M. Gabler
By Watson E. Coleman
Attorney Patented July 26, 1932

1,869,244

UNITED STATES PATENT OFFICE

FRANK MORRIS GABLER, OF MONUMENT, OREGON

TIRE TOOL

Application filed September 1, 1931. Serial No. 560,596.

This invention relates to the class of tools, and pertains particularly to a tool for handling pneumatic tires.

The primary object of the present invention is to provide a tool by means of which a pneumatic tire may be readily compressed at its edges to facilitate its disengagement from a wheel or rim, and which may also be employed for engaging the inner faces of the tire casing at the edges thereof and spreading the casing to facilitate the examining of the interior for breaks or foreign bodies which may be embedded therein.

Another object of the invention is to provide a tool for the above described purposes, having a pair of relatively long curved jaws carried by pivotally connected handle members which have associated therewith means for retaining them in a predetermined position for the maintenance of the jaws in open or closed position.

Still another object of the invention is to provide a tool of the above described character in which the connection between the jaws is such that when the handles are oscillated the jaws will be moved apart in substantially straight paths.

A still further object of the invention is to provide a tool having arcuately curved jaws which are carried upon arms so designed that they may be readily placed against opposite sides of a tire adjacent the edges thereof to effect the compression of the tire so that it may be removed from a wheel.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view partly in side elevation and partly in longitudinal section of the tool embodying the present invention.

Figure 2 is a view in front elevation of the tool.

Figure 3 is a fragmentary view of the forward end of the tool looking toward the jaws and illustrating the curvature of the same.

Referring now more particularly to the drawing, wherein like numerals of reference indicate corresponding parts throughout the several views, the numerals 1 and 2 indicate respectively the fixed and shiftable jaw carrying arms of the tool. The arm 1 is made up of two members, each of which is indicated by the numeral 3, which are in spaced parallel relation throughout the major portion of their lengths and are secured together at their rear ends in the handle member 4.

At its forward end the fixed arm 1 has the two members 3 formed to provide an offset substantially parallel portion 5 at the end of which portion the two members are secured together and from this point of connection between the members at their forward ends they merge into the gooseneck terminals 6 which are spread apart into a substantially V formation, as is clearly shown in Figure 2.

The arm 2, adjacent its forward end, is enlarged at one edge to form a toothed segment 7 and this segment portion of the arm is disposed between the members 3 of the fixed arm and is pivotally secured thereto by the pin 8 which passes through the radial center of the segment. The forward end of the arm 2 thus oscillates between the members 3 of the fixed arm. As the pivot 8 is a substantial distance inwardly from the free end of the arm 2 it will be seen that this free forward end, which is indicated by the numeral 9, moves relative to the offset portion 5 of the fixed arm. At the other end of the pivoted arm a handle 10 is formed which may be moved into position over the handle 4 of the fixed arm.

The free forward end 9 of the movable arm 2 is pivotally secured by the pin 11 between a pair of spaced bar members 12 which are arranged in substantially parallel relation, as shown. The connection of the end 9 of the arm 2 with these members is adjacent one end of the same and at this end the members are connected together by a yoke 13. At their other ends the members 12 are extended laterally to form the divergent portions 14.

The ends of the portions 14 of the members 12 are joined to a relatively long arcuate jaw 15 and associated with this jaw, which is the movable jaw of the tool, is a second jaw which is indicated by the numeral 16, and which is supported by the arched or gooseneck portions 6 which are carried by the fixed arm. These arcuate jaws 15 and 16 are arranged to extend transversely of the line of the supporting arms and have their concave faces directed away from the concave portion of the gooseneck extensions 6.

The bar members 12 are further connected with the fixed arm 1 by a link member 17, one end of which is pivotally secured therebetween, adjacent their forward ends, by the pin 18, while the other end is pivotally secured, as at 19, between the portions 3 of the fixed arm forwardly of the pivot 8. It will thus be seen that when the movable arm 2 is swung on its pivot the bars 12 which carry the movable jaw 15 will be moved longitudinally of the tool and will maintain a substantially parallel position with respect to the fixed arm 1.

In order to secure the jaws in separated or closely related positions there is provided a latch rod 20 which is mounted at one side of the fixed arm 1 in a guide 21 and which has its forward end turned to extend inwardly through slots 22 formed longitudinally through the members 3, as indicated at 23. This inturned portion 23 which forms a latch finger extends across the toothed edge of the segment 7 and is normally urged into engagement with this segment by a coil spring 24 which surrounds the rod 20 and has one end bearing against the guide 21 and its other end bearing against a fixed stop on the rod, as indicated at 25.

The other end of the rod 20 has engagement with a lever 26 which is pivotally secured at its forward end, as at 27, between the members 3 of the fixed arm and is normally disposed in close proximity to the underside of the handle 4.

From the foregoing description it will be readily seen that when the handles 4 and 10 of the two arms are moved apart the jaws 15 and 16 will be separated and it will then be an easy matter to engage the opposite sides of a tire casing adjacent its edges, between the jaws, by simply positioning the arched extensions 6 of the fixed arm over the tread of the casing. Upon then forcing the arms together the jaws will close against the sides of the casing and compress the same to facilitate its removal from a wheel. While this tool is primarily intended for removing tires from drop center steel wheels, it will, of course, be readily seen that it may be employed also as a casing spreader by engaging the ends of the jaws in the casing between the side walls and then swinging the arm 2 away from the fixed arm 1 so as to move the jaws apart. The latch finger 23 will serve to hold the jaws in either the opened or the closed position to which they may be moved.

Having thus described the invention, what is claimed is:

1. A tire tool of the character described, comprising a fixed arm, an oscillatable arm having pivotal connection adjacent one end with and extending across the fixed arm, a pair of arcuate members each secured to the end of the fixed arm adjacent the pivot point of the oscillatable arm therewith and extending forwardly from the fixed arm in divergent relation, an elongated jaw member carried by said arcuate members at their other ends, a second jaw member disposed before the concave sides of said arcuate members and adjacent the first jaw, and means connecting the said second jaw with the oscillatable arm and with the fixed arm whereby movement of the oscillatable arm will shift the second mentioned jaw relative to the first mentioned jaw.

2. A tire tool of the character described, comprising a fixed arm having a handle, an oscillatable arm having a handle and having pivotal connection adjacent one end with the fixed arm, a pair of arcuate members secured together at one end to the end of the fixed arm adjacent its pivotal connection with the oscillatable arm and extending forwardly in divergent relation from the fixed arm, an elongated arcuate jaw member extending transversely of the fixed arm and secured to the other ends of the arcuate members, a second elongated arcuate jaw member arranged in parallel relation with the first mentioned jaw member upon the concave side of the pair of arcuate members, an elongated body normally disposed substantially parallel to the fixed arm at the forward end thereof and having connection at one end with said second jaw, a pivotal connection between said elongated member and the adjacent free end of the oscillatable arm, and a link connection between the said elongated member and the fixed arm.

3. A tire tool of the character described, comprising a fixed arm having a handle, an oscillatable arm having a handle and having pivotal connection adjacent one end with the fixed arm, a pair of arcuate members secured together at one end to the end of the fixed arm adjacent its pivotal connection with the oscillatable arm and extending forwardly in divergent relation from the fixed arm, an elongated arcuate jaw member extending transversely of the fixed arm and secured to the other ends of the arcuate members, a second elongated arcuate jaw member arranged in parallel relation with the first mentioned jaw member upon the concave side of the pair of arcuate members, an elongated body normally disposed substantially parallel to the fixed arm at the forward end thereof and having connection at one end with said second jaw, a pivotal connection between said elongated member and the adjacent free end of the oscillatable arm, a link connection between the said elongated member and the fixed arm, a toothed segment forming an integral part of said oscillatable arm, and a spring actuated latch finger carried by the fixed arm for engagement with said segment to maintain the oscillatable arm in a set position.

4. A tire tool, comprising a fixed arm formed of a pair of spaced parallel members, a handle at one end of said arm and connecting said members, the other or forward end of said arm having a terminal portion disposed in offset relation to the main body, a pair of arcuate members secured together at one end and joining at said secured ends the offset terminal of the fixed arm, said arcuate members extending forwardly from the fixed arm in divergent relation, an elongated arcuate jaw member disposed transversely of the fixed arm and carried by the arcuate members, an oscillatable arm having a toothed segment formed integral with one edge adjacent one end and pivotally mounted at its radial center between the members of the fixed arm adjacent its forward end, a second elongated arcuate jaw disposed in parallel relation to the first mentioned jaw upon the concave sides of said arcuate members, an elongated member disposed substantially parallel with said fixed arm adjacent its forward end and having a pair of divergent extensions at one end, said divergent extensions being connected with said second mentioned jaw, a pivotal connection between the free forward end of the oscillatable handle and said elongated member, a link member pivotally connected at one end with said elongated member adjacent the divergent ends and having its other end pivotally connected between the members of said fixed arm, a handle upon the other end of the oscillatable arm, and a spring actuated latch member carried by the fixed arm for engagement with said segment.

5. A tire tool, comprising two arms pivotally connected in crossed relation, an arcuate jaw carried by and extending transversely of one arm at one end and offset with relation to the arm, a second jaw of the same configuration as the first jaw and disposed in the same position relative to the said one arm, a bar connected at one end with said second jaw and extending longitudinally of the said one arm, pivotal connecting means between the other arm and said bar, and means pivotally connecting said bar with said one arm for causing the bar and the second jaw to move longitudinally of the said one arm relative to the first jaw.

6. A tire tool, comprising two arms pivotally connected in crossed relation, an arcuate jaw carried by and extending transversely of one of the arms at one end and offset with relation to the arm, a second jaw of the same configuration as the first jaw and disposed in the same position relative to the said one of the arms and paralleling the first jaw, a bar connected at one end with said second jaw and extending longitudinally of the said one arm, a pivotal connection between the other arm and the bar adjacent the end of the bar remote from the jaw attached thereto, a link member disposed between said bar and the said one arm and pivotally connected with the same, said link coacting with the second mentioned arm to cause the second jaw to move longitudinally of the said one arm when the second arm is oscillated, a toothed segment upon the second mentioned arm and coaxial with the pivotal connection of the latter with the other arm, and a latch element mounted upon the said one arm for selective engagement with the teeth of the segment.

7. A tire tool comprising two arms, one arm extending adjacent one end across the other arm and having pivotal connection therewith, the said other arm constituting a fixed arm, an elongated arcuate jaw member disposed to extend transversely of the fixed arm adjacent the end thereof nearest said pivot and fixedly connected therewith with its concave side directed laterally therefrom, a second elongated arcuate jaw member in the same position as the first jaw relative to said fixed arm and disposed beside the fixed jaw upon the side thereof nearest the free end of the fixed arm, and connecting means between the second jaw and the other arm at the end nearest the pivot therefor whereby movement of the second jaw longitudinally of the tool and relative to the first jaw is effected upon relatively moving the arms.

In testimony whereof I hereunto affix my signature.

FRANK MORRIS GABLER.